(12) United States Patent
Linder et al.

(10) Patent No.: US 11,988,308 B2
(45) Date of Patent: May 21, 2024

(54) ELECTROSTATIC DISCHARGE MITIGATION DEVICE

(71) Applicant: ENTEGRIS, INC., Billerica, MA (US)

(72) Inventors: James C. Linder, Victoria, MN (US); Jeffrey J. McKenzie, Watertown, MN (US)

(73) Assignee: ENTEGRIS, INC., Billerica, MA (US)

( * ) Notice: Subject to any disclaimer, the term of this patent is extended or adjusted under 35 U.S.C. 154(b) by 822 days.

(21) Appl. No.: 17/011,919

(22) Filed: Sep. 3, 2020

(65) Prior Publication Data

US 2021/0071788 A1 Mar. 11, 2021

Related U.S. Application Data

(60) Provisional application No. 62/897,544, filed on Sep. 9, 2019.

(51) Int. Cl.
*F16L 25/01* (2006.01)
*F16L 25/02* (2006.01)
*H01B 1/14* (2006.01)

(52) U.S. Cl.
CPC .............. *F16L 25/01* (2013.01); *F16L 25/02* (2013.01); *H01B 1/14* (2013.01); *B01D 2201/50* (2013.01); *B01D 2239/0241* (2013.01)

(58) Field of Classification Search
CPC .......... F16L 25/01; F16L 25/02; B01D 63/06; B01D 2201/50; B01D 2239/0241; B01D 2313/13
USPC ....................................................... 439/192
See application file for complete search history.

(56) References Cited

U.S. PATENT DOCUMENTS

| | | | | |
|---|---|---|---|---|
| 3,042,737 A | * | 7/1962 | Brumbach | H05F 3/02 156/149 |
| 3,753,205 A | * | 8/1973 | Tuger | H01R 4/64 439/271 |
| 4,394,705 A | * | 7/1983 | Blachman | H05F 3/02 138/125 |
| 9,162,774 B2 | * | 10/2015 | Minteer | F16L 21/022 |
| 9,688,419 B2 | * | 6/2017 | Irwin | F16L 25/025 |
| 10,027,039 B1 | * | 7/2018 | Smith | H01R 4/38 |
| 10,254,257 B2 | * | 4/2019 | Ziegler | G01N 30/80 |
| 10,633,111 B2 | * | 4/2020 | Irwin | F17D 1/00 |
| 2008/0042439 A1 | | 2/2008 | Athalye | |
| 2009/0140106 A1 | | 6/2009 | Johnson | |
| 2013/0327888 A1 | * | 12/2013 | Gaw | F16L 21/005 285/48 |

(Continued)

FOREIGN PATENT DOCUMENTS

| CN | 202405695 U | * | 8/2012 | |
|---|---|---|---|---|
| CN | 104728542 A | * | 6/2015 | .............. F16L 23/06 |

(Continued)

*Primary Examiner* — Peter G Leigh

(57) ABSTRACT

This disclosure provides electrostatic discharge (ESD) mitigation devices. In one or more embodiments, the electrostatic discharge (ESD) mitigation device is a tubing connector to connect two or more conductive tubing segments in a fluid circuit, the tubing connector including an electrically conductive connector body with two or more attachment portions, two or more attachment fittings, and a conductive bracket configured to attach and interface with the connector body to electrically connect the connector body to ground.

15 Claims, 9 Drawing Sheets

(56) References Cited

U.S. PATENT DOCUMENTS

2013/0328307 A1* 12/2013 Irwin .................. F16L 9/14
  285/422
2013/0329333 A1* 12/2013 Minteer ............... F16L 21/065
  361/218
2019/0145560 A1*  5/2019 Leys .................... B01D 71/32
  439/192
2019/0178425 A1*  6/2019 Shirsale .............. F16L 21/06

FOREIGN PATENT DOCUMENTS

| CN | 215567048 U | * | 1/2022 | |
| DE | 20012363 U1 | * | 11/2001 | ............ F16L 11/127 |
| EP | 1295362 B1 | | 10/2010 | |
| EP | 2672157 A1 | * | 12/2013 | ............. B64D 37/32 |
| FR | 2974613 A1 | * | 11/2012 | ............. F16L 23/04 |
| WO | 2015097498 A1 | | 7/2015 | |

\* cited by examiner

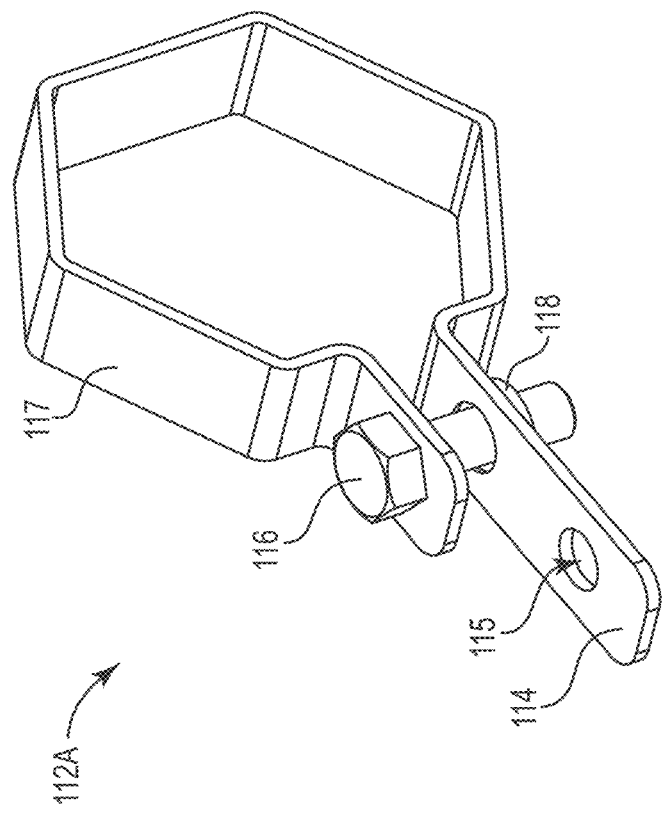

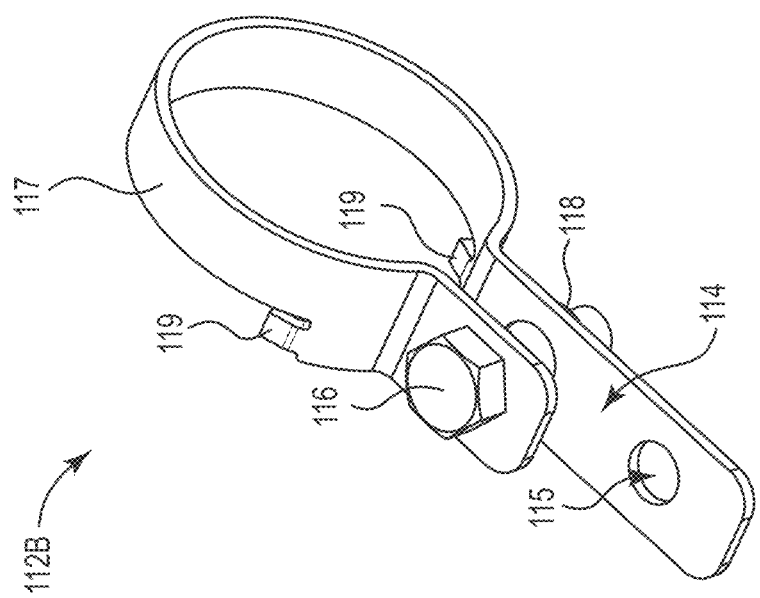

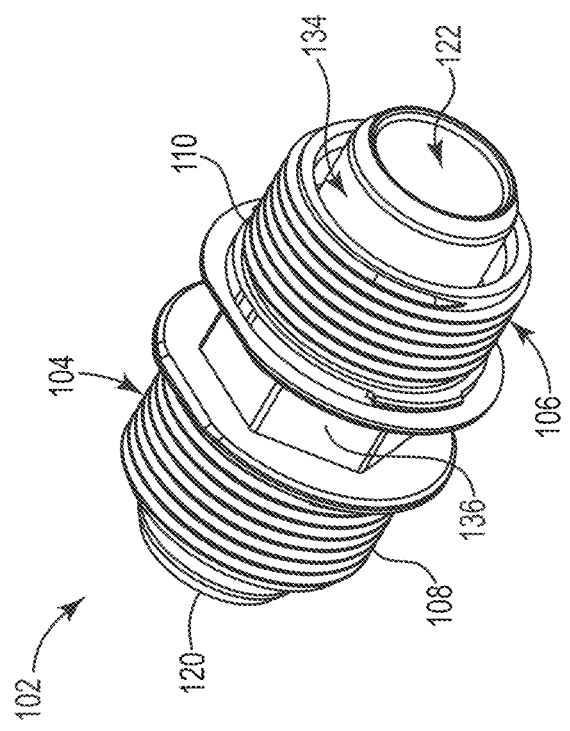
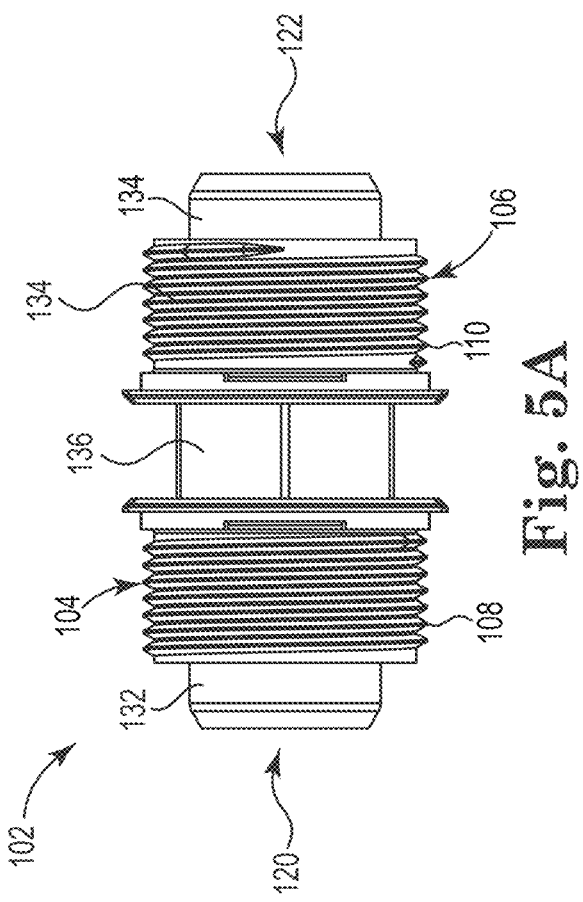

ELECTROSTATIC DISCHARGE MITIGATION DEVICE

CROSS-REFERENCE TO RELATED APPLICATION

This application claims priority to and the benefit of U.S. Provisional Application No. 62/897,544, filed on Sep. 9, 2019, which is incorporated herein by reference in its entirety for all purposes.

TECHNICAL FIELD

Embodiments of the present disclosure are directed electrostatic discharge (ESD) mitigation configurations that may be used, for example, in fluid handling systems, and more specifically, to a conductive bracket that can be incorporated into such fluid handling systems.

BACKGROUND

Electrostatic discharge (ESD) is an important technical issue for fluid handling systems in the semiconductor industry and in other technology applications. Frictional contact between fluids and surfaces of various operational components (e.g. tubing or piping, valves, fittings, filters, etc.) in the fluid system can result in generation and buildup of static electrical charges. The extent of charge generation depends on various factors including, but not limited to, the nature of the components and the fluid, fluid velocity, fluid viscosity, electrical conductivity of the fluid, pathways to ground, turbulence and shear in liquids, presence of air in the fluid, and surface area. Further, as the fluid flows through the system, the charge can be carried downstream in a phenomenon called a streaming charge, where charge may buildup beyond where the charge originated. Sufficient charge accumulations can result in an electrostatic discharge at the tubing or pipe walls, component surfaces, or even onto substrates or wafers at various process steps.

In some applications, semiconductor substrates or wafers are highly sensitive to static electrical charges and such ESD can result in damage or destruction of the substrate or wafer. For example, circuits on the substrate can be destroyed and photoactive compounds can be activated prior to regular exposure due to uncontrolled ESD. Additionally, built-up static charge can discharge from within the fluid handling system to the exterior environment, potentially damaging components in the fluid handling system (e.g. tubing or piping, fittings, components, containers, filters, etc.), that may lead to leaks, spills of fluid in the system, and diminished performance of components. In these situations, such discharge, may lead to potential fire or explosion when flammable, toxic and/or corrosive fluids are used in the compromised fluid handling system.

Often the weak link in an electrical system is the integrity of the ground. In some fluid handling systems, to reduce the buildup of static charges, certain metal or conductive components in fluid handling system are grounded to mitigate the buildup of static charge in the system as it continually disperses from the metal or conductive components to ground. At present, a conductive cable tie or "zip-tie" composed of a conductive polymer such as Nylon is sometimes used for connecting components to ground. Such polymeric cable ties are prone to creep, movement, breakage, environmental effects or sensitivity, deterioration, wear, etc., and have many drawbacks in practice.

It would be desirable to improve ESD mitigation and to provide a grounding device for use in ultra-pure fluid handling systems that gives improved component reliability, stability, performance, and reduction in potentially damaging ESD events.

SUMMARY

This disclosure generally relates to electrostatic discharge (ESD) mitigation devices that may be used, for example, in fluid handling systems, and more specifically, to a conductive bracket that can be incorporated into such fluid handling systems In some embodiments, a tubing connector to connect two or more conductive tubing segments in a fluid circuit is disclosed, the tubing connector including an electrically conductive connector body with two or more attachment portions, two or more attachment fittings, and a conductive bracket configured to attach and interface with the connector body to electrically connect the connector body to ground.

In certain embodiments of the tubing connector, the conductive bracket includes a clamp portion that interfaces with the connector body and selectively tightens to attach the bracket to the connector body. In other embodiments of the tubing connector, the conductive bracket includes a grounding fixture for connecting the bracket to ground. In some embodiments of the tubing connector the clamp portion is substantially circular in shape. In certain embodiments of the tubing connector, the clamp portion is substantially polygonal in shape. In certain other embodiments of the tubing connector, the clamp portion is substantially hexagonal in shape.

In various embodiments of the tubing connector, the tubing connector includes a straight connector, a T-connector, or an elbow connector. In certain embodiments of the tubing connector, the tubing connector is a straight connector having a fluid passageway to connect two tubing segments. In certain embodiments of the tubing connector, the tubing connector is an elbow connector having a fluid passageway to connect two tubing segments. In certain embodiments of the tubing connector, the tubing connector is a T-connector having fluid passageways to connect three tubing segments. In certain embodiments of the tubing connector, the connector body attachment portions include a threaded region and a nipple region to receive a tubing segment. In certain embodiments of the tubing connector, the attachment fittings include nuts to attach tubing segments to the threaded and neck regions of the tubing connector.

In some embodiments of the tubing connector, connector body is a conductively-filled polymer and more particularly, a conductively-filled fluoropolymer. In certain embodiments of the tubing connector, the conductive polymer is perfluoroalkoxy alkane polymer filled with carbon fiber, nickel coated graphite, carbon powder, carbon nanotubes, metal particles, and steel fiber. In certain embodiments of the tubing connector, the connector body is a carbon-filled perfluoroalkoxy alkane polymer. In certain embodiments of the tubing connector, each component of the tubing connector is conductively attached. In certain embodiments of the tubing connector, the tubing connector includes one or more interior conductive stripes that include a conductive fluoropolymer. In certain embodiments, a fluid circuit including at least one tubing segment connected to the tubing connector, where a conductive bracket transfers electrostatic charge to ground from a charge generated by fluid passing through the tubing segment and tubing connector This disclosure further describes an embodiment including a fluid circuit for a predetermined fluid flow passageway having at least one inlet and at least one outlet, the fluid circuit including at least one tubing connector including a conductive bracket connected to one or more conductive tubing segments.

The above summary is not intended to describe each illustrated embodiment or every implementation of the present disclosure.

BRIEF DESCRIPTION OF THE DRAWINGS

The drawings included in this disclosure illustrate embodiments of the present disclosure and, along with the description, serve to explain the principles of the disclosure. The drawings are only illustrative of certain embodiments and do not limit the disclosure.

FIG. 2 is a detailed view of an exemplary conductive bracket as shown in FIGS. 1A and 1B, where the conductive bracket is substantially polygonal in shape.

FIG. 3 is a detailed view of an alternate conductive bracket, where the conductive bracket is substantially circular in shape.

FIGS. 5A and 5B show the connector body of FIGS. 4A and 4B without the conductive bracket.

Figure 1A:
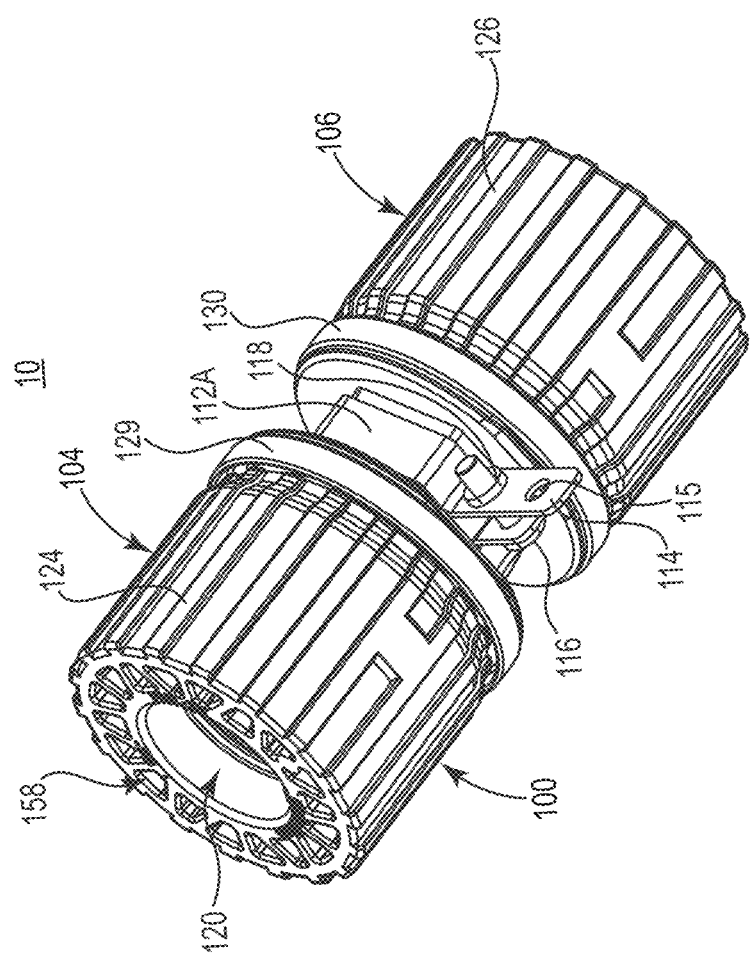
FIG. 1A is an isometric view of an assembly including a ESD mitigation tubing connector and a conductive bracket for grounding the connector, according to various embodiments of the disclosure.

The embodiments of this disclosure are amenable to various modifications and alternative forms, and certain specifics have been shown, for example, in the drawings and will be described in detail. It is understood that the intention is not to limit the disclosure to the particular embodiments described; the intention is to cover all modifications, equivalents, and alternatives falling within the spirit and scope of this disclosure.

DETAILED DESCRIPTION

The following detailed description should be read with reference to the drawings in which similar elements in different drawings are numbered the same. The detailed description and the drawings, which are not necessarily to scale, depict illustrative embodiments and are not intended to limit the scope of the invention. The illustrative embodiments depicted are intended only as exemplary. Selected features of any illustrative embodiment may be incorporated into an additional embodiment unless clearly stated to the contrary.

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

The term "about" generally refers to a range of numbers that is considered equivalent to the recited value (e.g., having the same function or result). In many instances, the term "about" may include numbers that are rounded to the nearest significant figure.

One or more embodiments of this disclosure are related to electrostatic discharge (ESD) mitigation. In particular, embodiments are directed to using a conductive bracket to provide a secure and reliable method to connect components of a fluid handling system to ground. The bracket can be custom made for each size and style fitting and can be installed before or after installation of the fitting in the system. Exemplary fluid handling systems include a fluid circuit including conductively connected operative components and ESD mitigation tubing segments. Conventional and some ESD mitigation fluid circuits are reported, for example, in International patent application, WO 2017/210293, which is incorporated herein by reference, except for express definitions or patent claims contained therein. Other ESD mitigation fluid circuits are reported, for example, in an Entegris brochure, FLUOROLINE® Electrostatic (ESD) Tubing, 2015-2017. Other patent owned by Applicant, U.S. patent application Ser. No. 16/287,847 filed Feb. 27, 2019 and Patent Cooperation Treaty Application No. PCT/US2020/032417, filed May 12, 2020, are incorporated herein by reference, except for express definitions or patent claims contained therein.

Figure 1B:
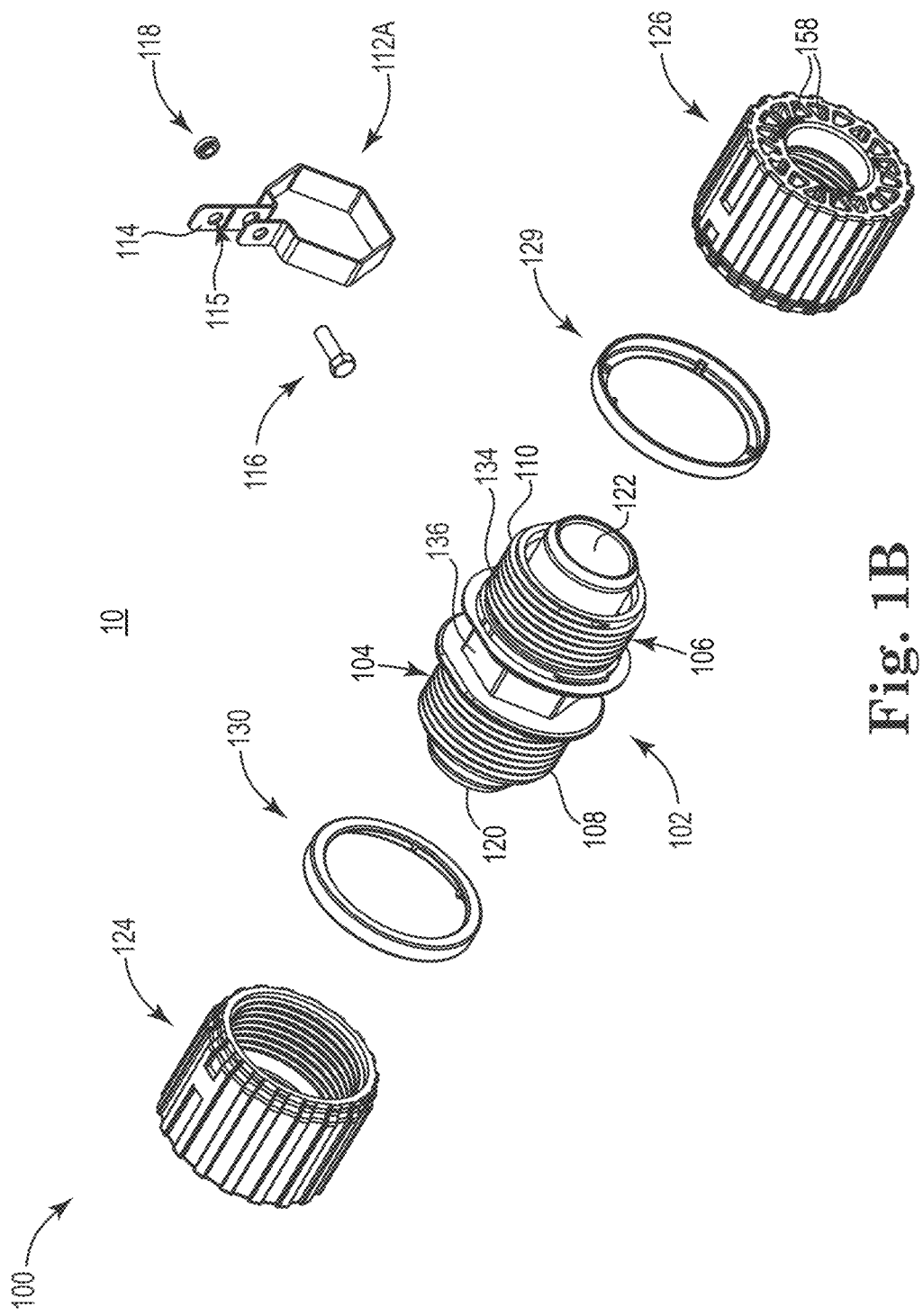
FIG. 1B is an exploded view of the assembly of FIG. 1A.
Figure 4B:
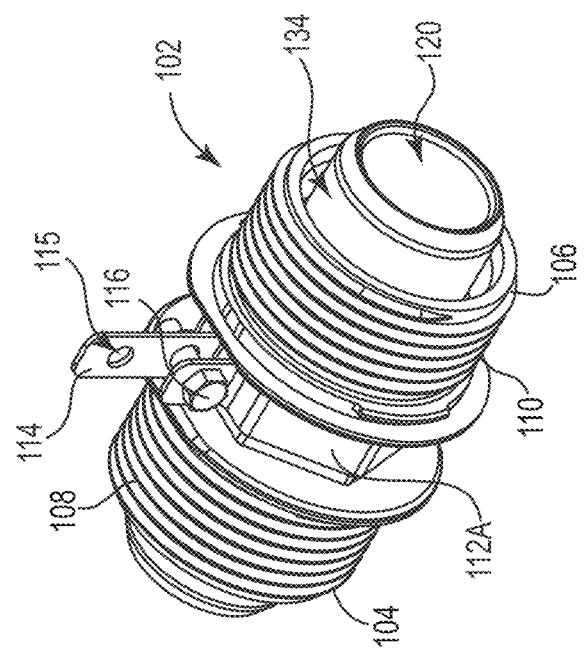
FIGS. 4A and 4B are more detailed views of the conductive bracket of FIG. 2 engaged with the connector body of FIG. 1B in accordance with embodiments of the disclosure.
Figure 4A:
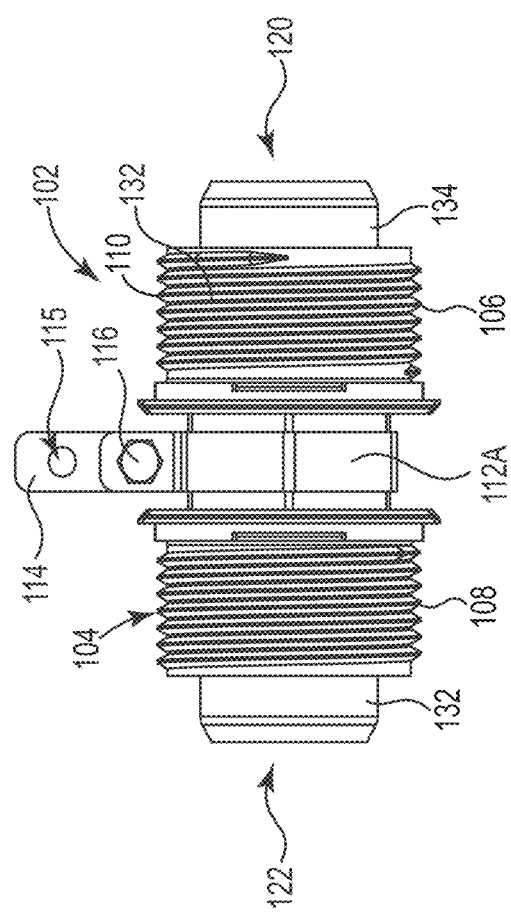

FIGS. 1A and 1B show different views an assembly 10, in accordance with various embodiments, including an exemplary ESD mitigation tubing connector 100 and a conductive bracket 112A for grounding a connector body 102. FIGS. 4A and 4B are more detailed views of a combination of the connector body 102 and conductive bracket 112A shown in FIGS. 1A and 1B. FIGS. 5A and 5B are more detailed views of the polymeric connector conductive body 102 shown in FIGS. 1A and 1B, with the conductive bracket 112A removed. Several connectors and fittings are contemplated for use herein including PRIMELOCK® fittings, PILLAR® fittings, FLARETEK® fittings, flared fittings, and other fittings. Exemplary fittings, for example, are illustrated in U.S. Pat. Nos. 5,154,453; 6,409,222; 6,412,832; 6,601,879; 6,758,104; and 6,776,440. Various sizes and scaling of the tubing connector and conductive bracket are contemplated.

An ESD mitigation tubing connector such as tubing connector 100 is configured to connect and define a fluid passageway between two or more tubing segments in a fluid circuit (not shown). In some cases, the tubing segments can be conductive tubing segments. A tubing connector can be any one of a straight tubing connector such as connector 100 as shown in FIGS. 1A-1B and 4A-5B, an elbow connector such as connector 170 shown in FIG. 6, or a T-connector such as connector 190 shown in FIG. 7.

In some embodiments, as shown in FIGS. 1A-1B and 4A-5B, the tubing connector 100 is a straight connector. The tubing connector 100 includes a connector body 102 having an inlet 120 and an outlet 122, two or more (i.e., first and second) attachment portions 104, 106, and two or more (i.e., first and second) attachment fittings 124, 126 configured to be engaged with the attachment portions 104, 106. The assembly 10, as shown in FIGS. 1A and 1B can optionally include one or more connection verification rings 129, 130 which are configured to engage with nuts 124, 126 to verify that a secure connection is made between the nuts 124, 126 and the connector body 102. First and second attachment portions 104, 106 can be the same or similar in various embodiments and, in some cases, the first 104 attachment portion can be a mirror image of the second attachment portion 106 as shown in FIGS. 1A-1B and 4A-5B.

As can be best viewed in FIGS. 1B and 4A-5B, the attachment portions 104, 106 each include a threaded portion 108, 110 and a nipple portion 132, 134 to receive a tubing segment. When integrated into a fluid circuit, nuts 124, 126 are used to configured to secure tubing segments to the nipple portions 132, 134 of the connector body 102. In some embodiments, the two or more attachment fittings 124, 126 are threaded connectors that are configured to be engaged with threaded portions 108, 110 provided on the attachment portions 104, 106 of the connector body 102. Attachment fittings 124, 126 are also shown in the embodiments depicted in FIGS. 6 and 7. In some embodiments, first and second attachment fittings 124, 126 are nuts that are configured to be threaded onto the respective threaded portions 108, 110 of the connector body 102. Additionally, in some cases, the attachment fittings 124, 126 can include one or more hollow sections 158 that include "coring." Coring of various components in various embodiments can have benefits, in particular in larger scale embodiments, and can improve molding characteristics and/or include materials savings, and the like.

Referring to FIGS. 1A-1B and 4-7, the connector body 102, 172, 192 is an electrically conductive connector body 102, 172, 192. The electrically conductive connector body 102, 172, 192 has a surface conductance and conductance through its bulk such that the connector body 102, 172 and 192 has both a surface resistivity and a volume resistivity. Although not wishing to be bound by theory, it is thought that electrostatic charge accumulates on the outer surface of the connector body 102, 172, 192 when incorporated into a fluid circuit used to transport a fluid as a result of the fluid flowing therethrough.

According to some embodiments, the electrically conductive connector body 102, 172, 192 is fabricated in its entirety from a conductive polymer and more particularly from a conductively-filled fluoropolymer. According to various embodiments the conductively-filled fluoropolymer can be a perfluoroalkoxy alkane (PFA) polymer filled with a conductive material. In some embodiments, the perfluoroalkoxy alkane (PFA) polymer is filled with a conductive material such as, but not limited to carbon fiber, nickel coated graphite, carbon powder, carbon nanotubes, metal particles, steel fiber, and combinations thereof. In one embodiment, the conductively-filled fluoropolymer from which connector body 102, 172, 192 is fabricated is perfluoroalkoxy alkane polymer filled with carbon powder. In one embodiment, the conductively-filled fluoropolymer from which connector body 102, 172, 192 is fabricated is a perfluoroalkoxy alkane polymer filled with carbon powder.

In other embodiments, only a portion of the connector body 102, 172, 192 is conductive. For example, in one embodiment the connector body 102, 172, 192 can include one or more conductive stripes on the inner surface and/or outer surface of the connector body 102, 172, 192. In another embodiment, the connector body 102, 172, 192 can include a conductive outer portion that is overmolded or coated onto a surface of the connector body 102, 172, 192.

FIGS. 2 and 3 show different embodiments of a conductive bracket (e.g. conductive brackets 112A, 112B) that can be used in accordance with various embodiments of the disclosure as described herein. The conductive bracket such as, for example, conductive bracket 112A, or 112B, is a conductive metal bracket capable of conveying an electrical charge to ground when the bracket is connected to a grounding wire. Any suitable metal conductor can be used to fabricate conductive metal brackets 112A, 112B. Conductive brackets 112A, 112B, can be configured to attach to and interface with an electrically conductive connector body such as connector body 102, 172, 192 (see FIGS. 1A-1B and 4A-7). Conductive brackets 112A, 112B can be then used to electrically connect the connector body 102, 172, 192 to a grounding wire that is in turn connected to a grounding terminal.

Conductive brackets 112A, 112B can be sized and shaped to interface with and contact an outer surface of a tubing connector such as, for example, tubing connector 100 or other fluid handling system component to which it can be coupled. More particularly the conductive bracket 112A, 112B is sized and shaped to contact an outer surface of neck region of a connector body such as neck region 136 of connector body 102 shown in FIG. 1B, neck region 176 of connector body 172 shown in FIG. 6, or neck region 196 of connector body 192 shown in FIG. 7. The conductive brackets can be substantially circular or polygonal in shape depending on the shape of neck region to which it is to be coupled. In one embodiment, as shown in greater detail in FIG. 2, the conductive bracket 112A is a substantially polygonal (e.g., multi-faceted) conductive bracket. In another embodiment, the conductive bracket 112B is substantially circular.

As shown in FIGS. 2 and 3, conductive brackets 112A, 112B each include a clamp portion 117 that is configured to interface with a neck region of a connector body and selectively tightens to attach the bracket 112A to the neck region of the connector body. The clamp portion 117 can be sized and shaped to circumscribe the neck region and when selectively tightened, contact an outer surface of the neck region to establish an electrical connection between the connector body and the conductive bracket 112A, 112B as shown in FIGS. 1A, 4A-B, and 6-7.

According to various embodiments, conductive brackets 112A, 112B include a grounding feature, such as bracket ground tab 114 and/or bracket grounding opening 115, for connecting the bracket 112A, 112B to a grounding wire which can be connected in turn to a grounding terminal to ground the connector or fitting to which the conductive bracket is attached (not shown). The conductive brackets 112A, 112B can also include a fastener. In one embodiment, the fastener can be a threaded bracket bolt 116 that can be configured to threadably interface with a threaded bracket nut 118 in order to selectively tighten or loosen the bracket 112A (best viewed in FIG. 1B). Non-threaded embodiments are also contemplated, where any form of fastener can be employed. Also best viewed in FIG. 1B, the bracket 112A can also include one or more bracket bolt openings, though which the bracket bolt 116 passes through one or more portions of the bracket 112A.

FIG. 3 shows an alternative conductive bracket 112B, where the clamp portion 117 is substantially cylindrical, circular, or rounded in shape. The circular conductive bracket 112B can also include one or more bracket rotational locking tabs 119, which can interface with a neck portion 136 of a connector body 172, 192 as shown in the embodiments illustrated in FIGS. 6 and 7. The circular conductive bracket 112B can also include one or more bracket rotational locking tabs 119, which can interface with a neck region 176, 196 of a connector body 172, 192 as shown in the embodiments illustrated in FIGS. 6 and 7. The bracket rotational locking tabs 119 can protrude toward an interior of the clamp portion 117 of the bracket 112B. In particular embodiments, a corresponding neck region 136, 176, 196

(with at least some narrowed diameter portion relative to the corresponding connector body 102) of a connector body 172 or 192 may also include a recess for receiving the locking tabs 119 for secure, rotation-resistant mounting. In particular embodiments, the neck region 176 or 196 (with at least some narrowed diameter portion relative to the corresponding connector body 102) of a connector body 172 or 192 may also include a recess for receiving the locking tabs 119 for secure, rotation-resistant mounting. In other embodiments, locking tabs 119 can instead be configured to apply pressure to the neck region 176, 196 of the respective conductive body 172, 192 when the bracket 112B is tightened, in order to restrict rotation of the conductive body.

Figure 6:
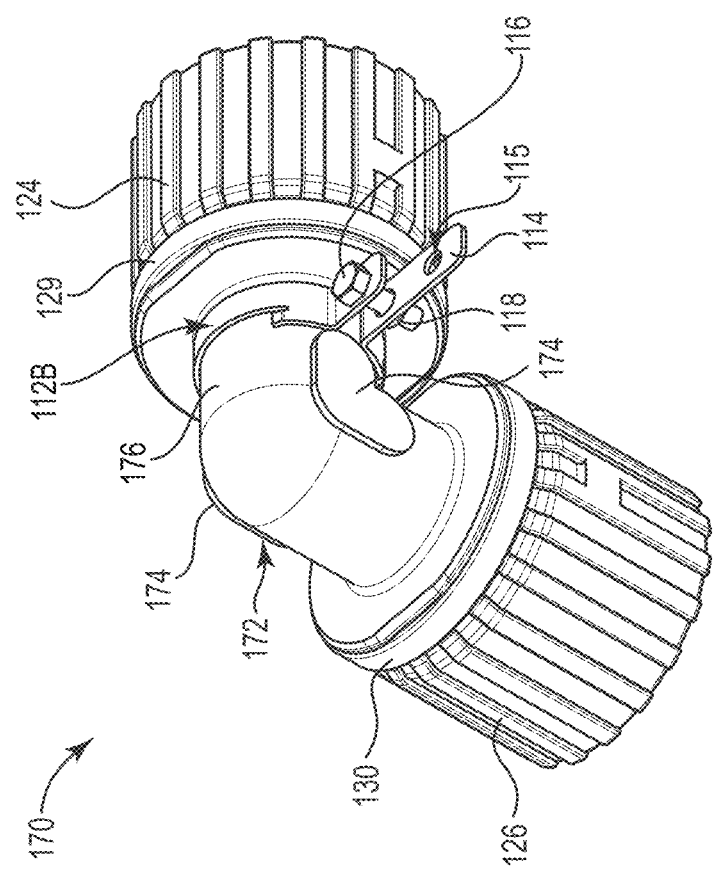
FIG. 6 shows another assembly including a conductive bracket engaged with a connector in accordance with an embodiment of the disclosure.

FIG. 6 shows an assembly including an alternative, ESD mitigation tubing connector 170 and a conductive bracket 112B provided in accordance with embodiments of the disclosure. As shown in FIG. 6, the tubing connector 170 is an elbow-shaped connector 170 having a fluid passageway to connect two tubing segments (not shown). The tubing connector 170 is similar in configuration and function to the tubing connector 100, but the connector body 172 has a bend at a certain angle, such as 90° as shown. One or more gate pads 174 can be included on the connector body 172. The gate pad 174 can be used for trimming a sprue off various molded parts. Trimming can be accomplished by a free hand knife cut, by machine, or any other suitable techniques.

Figure 7:
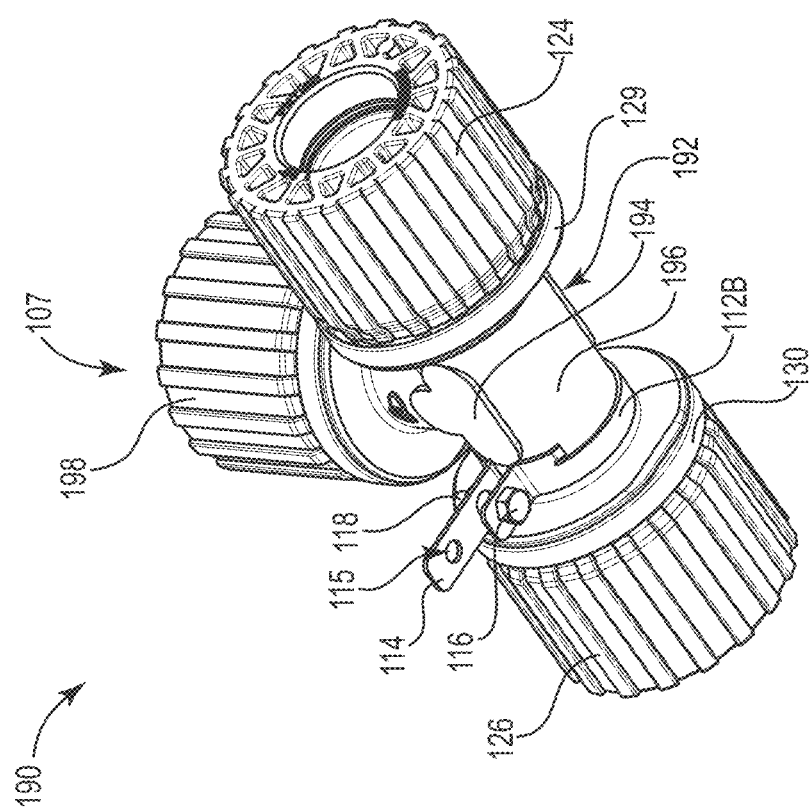
FIG. 7 shows yet another assembly including a conductive bracket engaged with a connector in accordance with an embodiment of the disclosure.

FIG. 7 shows another assembly including another ESD mitigation tubing connector 190 and bracket 112B provided in accordance with embodiments of the disclosure. As shown in FIG. 7, the tubing connector 190 is a T-shaped connector 190 having a fluid passageway to connect three tubing segments (not shown). The tubing connector 190 is similar in configuration and function to the tubing connector 100 and 170, but the connector body 192 has a T-shaped, three-way connector with an internal intersection, as shown. A third attachment portion 107 includes third attachment threaded connector 198, and any other parts found in the first and second attachment portions 104 and 106 are contemplated for third and in some cases fourth, fifth, or any number of attachment portions as the tubing connector gains further attachment points. As shown, one or more gate pad 194 is included on the connector body 192. The gate pad 194 can be used for trimming a sprue off various molded parts. Trimming can be accomplished by a free hand knife cut, by machine, or any other suitable techniques.

Connectors 100, 170 and/or 190 can be used to connect various tubing segments together to form a fluid circuit having at least one inlet and one outlet where a conductive bracket (e.g., 112A, 112B) transfers electrostatic charge to ground from a charge generated by fluid passing through the tubing segment and the tubing connector 100. According to some embodiments, a fluid circuit includes a plurality of tubing segments interconnected by plurality of tubing connectors, as described herein according the various embodiments. The fluid circuit can also include one or more operative components including, but not limited to fittings, valves, filters, heat exchanges, sensors, pumps, mixers, spray nozzles, purifiers, degassers, and dispense heads.

Figure 8:
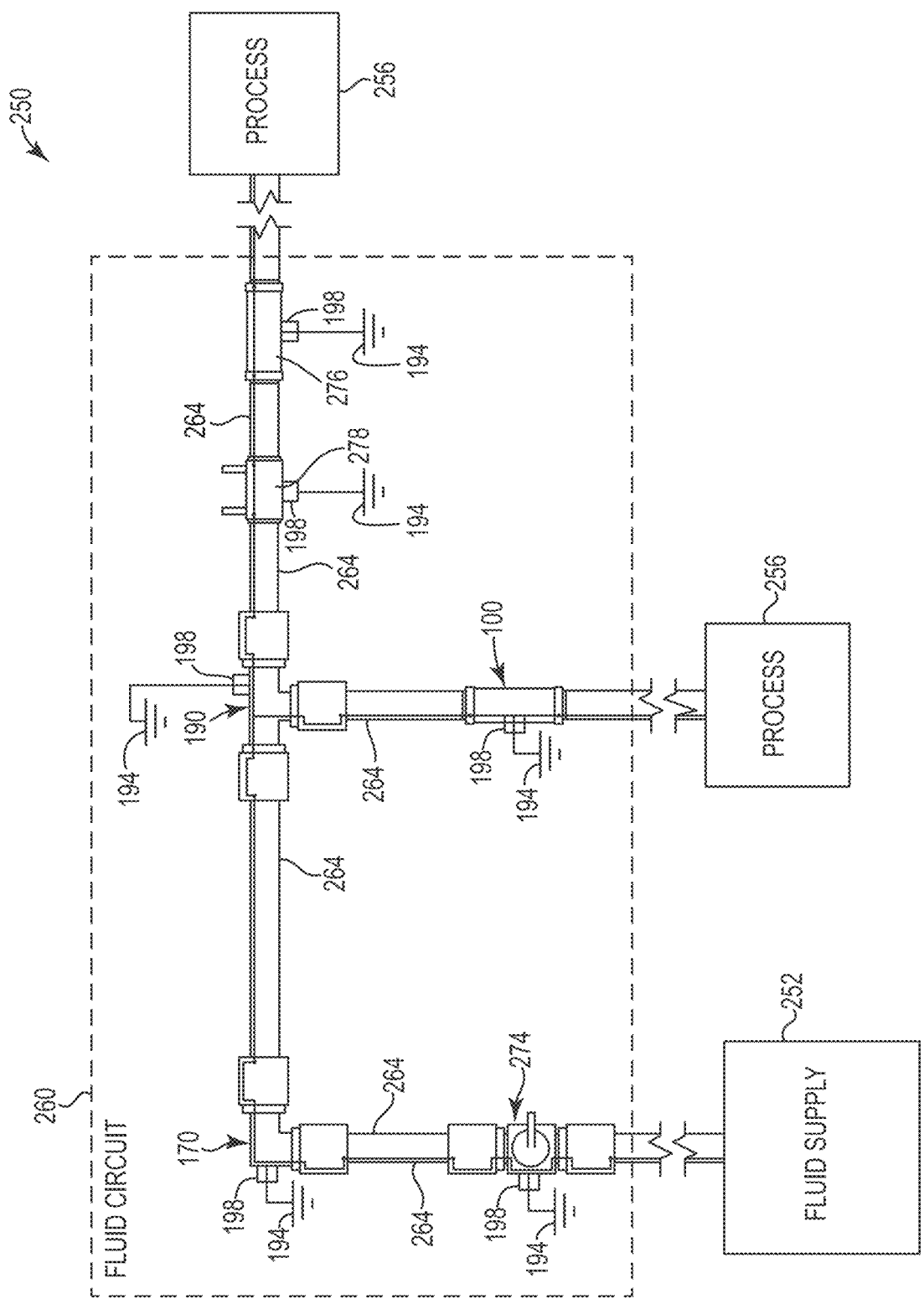
FIG. 8 shows an exemplary fluid handling system in accordance with various embodiments.

FIG. 8 depicts an exemplary fluid handling system 250. The system 250 provides a flow path for fluid to flow from a fluid supply 252 to one or more process stages 256 positioned downstream of the source of fluid supply. System 250 includes a fluid circuit 260 which includes a portion of the flow path of the fluid handling system 250. The fluid circuit 260 includes a plurality of tubing segments 264 interconnected by a plurality of connectors 100, 170, 190 and a plurality of operative components. In FIG. 6, the operative components include valve 274, filter 276, and flow sensor 278. These are just some examples. However, in various embodiments, the fluid circuit 260 can include additional or fewer operative components and connectors in number and in type. Connected together, the plurality of tubing segments 264, connectors 100, 170, 190, and operative components 274, 276, 278 provide a fluid passageway through the fluid circuit 260 from the fluid supply 252 and toward the process stages 256.

In certain embodiments, to mitigate static charge buildup, one or more of the connectors 100, 170, 190 are electrically connected to ground 194 via one or more conductive brackets 198 as described herein according to the various embodiments. The conductive brackets 198 facilitate the continuous dispersion of electrostatic charges as they build up in and on the surfaces the fluid circuit 260 by providing a pathway to ground 194. In some cases, the conductive brackets 198 are connected to a grounding wire which is then, in turn, connected to a grounding terminal. In some embodiments, one or more operative components can be also connected to ground 194 via one or more conductive brackets 198, as shown in FIG. 8.

Tubing segments in this disclosure typically refer to any flexible or inflexible pipe or tube that is suitable for containing or transporting fluid. Tubing segments can be conductive, providing a conductive pathway along the length of each tubing segment in the fluid circuit. Conductive tubing may be constructed from materials including metal or filled polymeric material. Filled polymeric material includes a polymer that is filled with steel wire, aluminum flakes, nickel coated graphite, carbon fiber, carbon powder, carbon nanotubes, or other conductive material. In some instances, the tubing segments are partially conductive, having a main portion constructed from non-conductive or low conductive material and a secondary, conductive portion. The non-conductive portion can be as constructed from various hydrocarbon and non-hydrocarbon polymers such as, but are not limited to, polyesters, polycarbonates, polyamides, polyimides, polyurethanes, polyolefins, polystyrenes, polyesters, polycarbonates, polyketones, polyureas, polyvinyl resins, polyacrylates, polymethylacrylates and fluoropolymers. Exemplary fluoropolymers include, but are not limited to, perfluoroalkoxy alkane polymer (PFA), ethylene tetrafluoroethylene polymer (ETFE), ethylene tetrafluoroethylene and hexafluoropropylene polymer (EFEP), fluorinated ethylene propylene polymer (FEP), and tetrafluoroethylene polymer (PTFE). The secondary conductive portion can be constructed from materials including metal or conductively-filled polymeric material as described herein.

In some embodiments, the tubing segments include a non-conductive portion and a second conductive portion which includes one or more conductive stripes defined on an interior of the tubing segments and extending along a length of the tubing segments. In some embodiments, the conductive stripe is composed of a conductively-filled fluoropolymer and more particularly, a perfluoroalkoxy alkane polymer filled with carbon powder. Exemplary tubing segments including one or more conductive stripes on an interior of the tubing segment are shown and described in International Patent Application, PCT/US2019/019759, which is incorporated herein by reference, except for express definitions or patent claims contained therein.

Aspects

Aspect 1 is an assembly comprising: a tubing connector to connect two or more conductive tubing segments in a fluid circuit, the tubing connector having an inlet and an outlet and including an electrically conductive connector body, two or more attachment portions, and two or more attachment fittings; and a conductive bracket in contact with the electrically conductive connector body for electrically connecting the connector body to ground.

Aspect 2 is the assembly of aspect 1, wherein the conductive bracket includes a clamp portion that circumscribes the electrically conductive connector body and selectively tightens to attach the bracket to the connector body.

Aspect 3 is the assembly of aspect 2, wherein the conductive bracket comprises a grounding fixture for connecting the bracket to ground.

Aspect 4 is the assembly of aspect 2, wherein the clamp portion is substantially circular in shape.

Aspect 5 is the assembly according to aspect 2, wherein the clamp portion is substantially polygonal in shape.

Aspect 6 is the assembly according to aspect 2, wherein the clamp portion is substantially hexagonal in shape.

Aspect 7 is the assembly according to any one of aspects 1-6, wherein the tubing connector comprises a straight connector, a T-connector, or an elbow connector.

Aspect 8 is the assembly according to aspect 7, wherein the tubing connector is a straight connector having a fluid passageway to connect two tubing segments.

Aspect 9 is the assembly according to aspect 7, wherein the tubing connector is an elbow connector having a fluid passageway to connect two tubing segments.

Aspect 10 is the assembly according to aspect 7, wherein the tubing connector is a T-connector having fluid passageways to connect three tubing segments.

Aspect 11 is the assembly according to aspect 1, wherein the two or more attachment portions of the tubing connector each comprise a threaded region and a nipple region to receive a tubing segment.

Aspect 12 is the assembly according to aspect 11, wherein the two or more attachment fittings each comprise nuts to attach tubing segments to the neck and threaded regions of the tubing connector.

Aspect 13 is the assembly according to aspect 1, wherein electrically conductive connector body comprises a conductively-filled fluoropolymer.

Aspect 14 is the assembly of according to aspect 13, wherein the conductively-filled fluoropolymer is perfluoroalkoxy alkane polymer filled with a conductive material selected from the group consisting of carbon fiber, nickel coated graphite, carbon fiber, carbon powder, carbon nanotubes, metal particles, and steel fiber.

Aspect 15 is the assembly according to aspect 13, wherein the conductively-filled fluoropolymer is a carbon-filled perfluoroalkoxy alkane polymer.

Aspect 16 is the assembly according to any one of aspects 1-15, wherein each of the electrically conductive connector body, two or more attachment portions, and two or more attachment fittings of the tubing connector is conductively attached such that an electrical charge can pass from the conductor body to the two or more attachment portions and/or the two or more attachment fittings.

Aspect 17 is the assembly according to any one of aspects 1-15, wherein electrically conductive connector body includes one or more interior conductive stripes comprising a conductively-filled polymer.

Aspect 18 is the assembly according to any one of aspects 1-15, wherein the electrically conductive connector body further comprises a non-conductive body portion that defines a fluid flow path extending between the inlet and the outlet of the tubing connector, wherein the conductive body portion is in contact with the non-conductive body portion and is displaced outwardly from the fluid flow path.

Aspect 19 is the assembly according to any one of aspects 1-15, wherein an entirety of the electrically conductive connector body is fabricated from a conductively-filled polymer.

Aspect 20 is a fluid circuit comprising at least one tubing segment connected to the assembly according to any one of aspects 1-15, wherein the conductive bracket transfers electrostatic charge generated by fluid passing through the tubing segment and tubing connector to a grounding wire connected to a grounding terminal.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. An assembly comprising:
 a tubing connector to connect two or more conductive tubing segments in a fluid circuit, the tubing connector having an inlet and an outlet and including an electrically conductive connector body, two or more attachment portions, and two or more attachment fittings; and
 a conductive bracket in contact with the electrically conductive connector body for electrically connecting the connector body to ground
   wherein the conductive bracket comprises a grounding fixture and a grounding opening for connecting the bracket to ground.

2. The assembly of claim 1, wherein the conductive bracket includes a clamp portion that circumscribes the electrically conductive connector body and selectively tightens to attach the bracket to the connector body.

3. The assembly of claim 2, wherein the clamp portion is substantially circular in shape.

4. The assembly of claim 2, wherein the clamp portion is substantially polygonal in shape.

5. The assembly of claim 2, wherein the clamp portion is substantially hexagonal in shape.

6. The assembly of claim 1, wherein the tubing connector comprises a straight connector, a T-connector, or an elbow connector.

7. The assembly of claim 6, wherein the tubing connector is a straight connector having a fluid passageway to connect two tubing segments.

8. The assembly of claim 6, wherein the tubing connector is an elbow connector having a fluid passageway to connect two tubing segments.

9. The assembly of claim 6, wherein the tubing connector is a T-connector having fluid passageways to connect three tubing segments.

10. The assembly of claim 1, wherein the two or more attachment portions of the tubing connector each comprise a threaded region and a nipple region to receive a tubing segment.

11. The assembly of claim 10, wherein the two or more attachment fittings each comprise nuts configured to attach tubing segments to the neck and threaded regions of the tubing connector.

12. The assembly of claim 1, wherein electrically conductive connector body comprises a conductively-filled fluoropolymer.

13. The assembly of claim 12, wherein the conductively-filled fluoropolymer is perfluoroalkoxy alkane polymer filled with a conductive material selected from the group consisting of carbon fiber, nickel coated graphite, carbon fiber, carbon powder, carbon nanotubes, metal particles, and steel fiber.

14. The assembly of claim 13, wherein the conductively-filled fluoropolymer is a carbon-filled perfluoroalkoxy alkane polymer.

15. A fluid circuit comprising at least one tubing segment connected to the assembly according to claim 1, wherein the conductive bracket transfers electrostatic charge generated by fluid passing through the tubing segment and tubing connector to a grounding wire connected to a grounding terminal.

* * * * *